United States Patent Office 3,270,055
Patented August 30, 1966

3,270,055
5-AMINOALKOXY ETHERS OF 5-HYDROXYIMINO-10,11 - DIHYDRO-5H-DIBENZO(a,d)CYCLOHEPTA(1,4)DIENES
Hermann Engelhard, Planckstr. 6A; Norbert Engelhard, Stauffenbergring 12; and Brigitte Werth, Am Steinsgraben 42, all of Gottingen, Germany
No Drawing. Filed Sept. 8, 1964, Ser. No. 395,018
Claims priority, application Germany, Sept. 11, 1963, E 25,493
3 Claims. (Cl. 260—566)

The invention relates to the production of new dibenzocycloheptadiene ketoxime-O ethers having the general formula

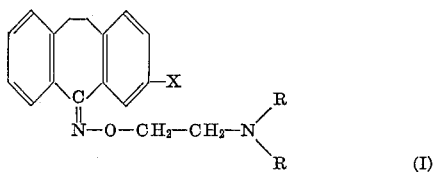

(I)

in which X represents hydrogen chlorine or bromine, preferably hydrogen or chlorine, and R a methyl or ethyl group.

It has been found that ketoxime-O ethers having the general Formula I, while of low toxicity (amounting to approximately 12 mg./kg., for example, in the case of the dibenzo-cycloheptadiene derivative wherein $X=H$), have a strongly thymoleptic action, making them particularly suitable for the therapeutic treatment of psychic disorders. Among the psychopharmacological agents having thymoleptic action, compounds are already known which are derived from tricyclic substances containing a central hepta ring and two linked benzene rings. N-($\gamma$-dimethyl aminopropyl)-iminodibenzyl hydrochloride and 5 - (3 - dimethyl aminopropylidene) - dibenzo(a,d,) - cycloheptadiene(1,4)-hydrochloride may be regarded at present as important representative compounds of this type. Compared to these substances, the new compounds of this invention are unexpectedly more powerful in their action, as can be demonstrated by means of a "Fighting-Fish" test. The results of such a test are recorded hereunder, in Tables 1 and 2.

For the "fighting-fish" test, fighting-fish were placed in an aquarium a pair at a time, the aquarium being divided in two by a glass partition. The substance to be tested was added to the water in the aquarium. At given intervals, the numbers of fish which changed colour (column a) and which adopted an aggressive attitude (column b) were recorded. In Tables 1 and 2, the number of creatures reacting passively appears in each case before the oblique stroke, which is followed by the total number of creatures. As can be seen, the substance under test, produced as in Example 3, even at a concentration of 3.5 mg./l., was found to be more effective than the reference substance at 10 mg./l.

In accordance with the invention, the ketoxime-O ethers having the general Formula I are produced by reacting a ketoxime having the general formula

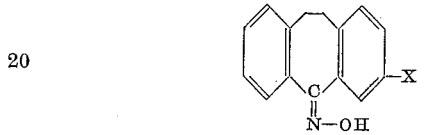

(II)

in which X is defined as above noted with $\beta$-chloroethyl diethylamine or $\beta$-chloroethyl dimethylamine in the presence of sodium ethylate.

The etherification is preferably effected by boiling the reagents in an alcohol solution with reflux, the common salt formed being filtered when reaction is complete and the solvent subsequently distilled off. The desired ketoxime-O ether is normally in the form of a viscous oil, which can be purified by distillation under high vacuum. From the ketoxime-O ethers, the hydrochloride can be obtained by precipitation with a molal quantity of hydrochloric acid.

When $\beta$-chloroethyl dimethylamine is used as one of the reagents, it is preferred to start with the hydrochloride instead of the free amine, because the free $\beta$-chloroethyl dimethylamine has a greater cyclifying tendency than $\beta$-chloroethyl diethylamine. The free amine can be liberated from the hydrochloride during the reaction by dripping a solution of $\beta$-chloroethyl dimethylamine hydrochloride in ethanol into the reaction solution containing sodium ethylate which is boiled with reflux.

TABLE 1.—10,11 DIHYDRO - 5H - DIBENZO(a,d)-CYCLOHEPTADIENE-(1,4)-5-HYDROXYIMINO-O-ETHYL - ($\beta$ - DIMETHYLAMINO)-ETHER HYDROCHLORIDE. (SUBSTANCE MADE ACCORDING TO EXAMPLE 3.)

| Concentr. | 3 min. | | 5 min. | | 10 min. | | 15 min. | | 20 min. | |
|---|---|---|---|---|---|---|---|---|---|---|
| | a | b | a | b | a | b | a | b | a | b |
| 1 mg./l | 0/5 | 0/5 | 0/5 | 0/5 | 2/5 | 0/5 | 2/5 | 1/5 | 2/5 | 1/5 |
| 1 mg./l | 0/5 | 0/5 | 1/5 | 1/5 | 1/5 | 1/5 | 2/5 | 1/5 | 2/5 | 1/5 |
| 3.5 mg./l | 4/10 | 4/10 | 5/10 | 4/10 | 7/10 | 5/10 | 10/10 | 7/10 | 10/10 | 8/10 |
| 5 mg./l | 3/5 | 5/5 | 5/5 | 5/5 | 5/5 | 5/5 | 5/5 | 5/5 | 5/5 | 5/5 |
| 10 mg./l | 4/5 | 5/5 | 5/5 | 5/5 | 5/5 | 5/5 | 5/5 | 5/5 | 5/5 | 5/5 |

TABLE 2.—N-($\gamma$-DIMETHYL AMINOPROPYL)-IMINODIBENZYL-HYDROCHLORIDE.
(REFERENCE SUBSTANCE)

| Concentr. | 3 min. | | 5 min. | | 10 min. | | 15 min. | | 20 min. | |
|---|---|---|---|---|---|---|---|---|---|---|
| | a | b | a | b | a | b | a | b | a | b |
| 10 mg./l_g | 0/10 | 1/10 | 0/10 | 3/10 | 2/10 | 5/10 | 4/10 | 6/10 | 5/10 | 7/10 |

To release the ketoxime used in the reaction, one can start with the corresponding ketone, which can be obtained in the conventional manner by, for example, cycling dibenzyl-O carboxylic acid with polyphosphoric acid. Ketoximation is brought about by boiling the ketone with excess hydroxylamine in pyridine with reflux. As an alternative to this, however, ketoximation may also be carried out in caustic soda (approx. 40%) with reflux. This will provide somewhat lower yield of ketoxime, but the unconverted ketone, which can be re-used, can be precipitated by dilution of the solution and separated by centrifuging. The residue is then acidified to precipitate the ketoxime, which is normally crystalline in character.

The invention is further described by the following non-limiting examples:

EXAMPLE 1.—PREPARATION OF 10,11-DIHYDRO-5H-DIBENZO (a,d)-CYCLOHEPTADIENE (1,4)-5-HYDROXYIMINO-O-ETHER-$\beta$ - DIETHYLAMINO ETHER To produce the ketoxime required for the reaction, 40 g. (~1 mol) of powdered sodium hydroxide was added, while stirring, to 20 g. (~0.1 mol) of 10,11-dihydro-5H-dibenzo (a,d)-cycloheptadiene (1,4)-5-on and 20 g. (~0.29 mol) of hydroxylamine hydrochloride in 300 ml. of 95% alcohol and 100 ml. of water. After 6 hours' boiling with reflux, the cooled reaction solution was diluted with 2 litres of water and left to stand for 2 hours, during which the ketone settled out slowly as oil. The oil was separated by centrifuging and conc.hydrochloric acid was used to adjust its pH to 6. While the solution was being stirred, the ketoxime slowly came down in the form of analytically pure crystals (needles), Fp. 171° C. The yield was 5.1 g., or 24% based on the ketone used.

For further conversion to ketoxime-O ether, 5.0 g. (~0.02 mol) of the ketoxime and 3.02 g. (~0.02 mol) of $\beta$-chloroethyl diethylamine were dissolved in a cooled solution of 0.51 g. (~0.02 mol) of sodium in 50 ml. of dry alcohol. After 8 hours' boiling with reflux, the common salt formed was filtered off and the alcohol distilled off in the water-jet vacuum chamber. For purification, the ketoxime-O ether, which occurred as a brown oil, was reabsorbed in alcohol and treated with activated charcoal. When the alcohol had been distilled off, a thick yellow oil was left, which distilled at 161° C. in high vacuum at 0.001 mm. The yield was 5.7 g., or 80% based on the ketoxime used.

The ketoxime-O ether distilled in high vacuum was added to ether and a molal quantity of hydrochloric acid, whereupon the hydrochloride separated out (Fp. 200° C.–202° C.), the yield being 80% based on the amount of ketoxime-O ether used. Any excess of hydrochloric acid must be avoided; otherwise, a Beckmann rearrangement takes place, which results in a considerably reduced yield.

To characterise the ketoxime-O ether formed, the Reineckate was formed in an acetic acid solution with Reinecke salt and separated out after being left to stand for a long time. (Fp. 162° C.)

For further conversion, molal quantities of ketoxime-O ether and methyl iodide were converted in alcohol by heating to 50° C. under pressure. After the addition of ether, the quaternary salt separated out as an oil, which congealed after repeated washing with ether.

EXAMPLE 2.—PREPARATION OF 3-CHLOR-10,11-DIHYDRO-5H-DIBENZO (a,d) - CYCLOHEPTADIENE (1,4)-5-HYDROXYIMINO-O-ETHYL - ($\beta$ - DIMETHYLAMINO) ETHER A quantity of 73 g. (~0.3 mol) of 3-chlor-10,11-dihydro-5H-dibenzo (a,d)-cycloheptadiene (1,4)-5-on (Fp. 41° C.) and 62 g. (~0.9 mol) of hydroxylamine hydrochloride was boiled for 35 hours in 1 litre of pyridine, with reflux. The pyridine was drawn off in vacuo and the residue was absorbed in ether, washed successively with dilute hydrochloric acid, sodium carbonate solution and water and then dried over sodium sulphate. When the ether had been distilled off, the crude product was precipitated from benzene petrol ether (boiling at 40° C.). The yield of Cl ketoxime (Fp. 162° C.–163° C.) was 60.5 g., or 78% based on the ketone used.

For further conversion to Cl-ketoxime-O ether, 26 g. (~0.1 mol) of Cl ketoxime was dissolved in a solution of about 5.2 g. (~0.225 mol) of sodium in 300 ml. of ethanol. A solution of 18 g. (~0.125 mol) of $\beta$-chloro dimethylamine hydrochloride in 120 ml. of ethanol was dripped within 1¼ hours into the solution boiling with reflux. Boiling with reflux was then continued for 4 hours, the common salt formed being filtered from the solution obtained and the solvent evaporated off. The residue was distilled in a high vacuum of 0.01 torr at 189° C.–199° C. The yield of Cl ketoxime-O ether was 24 g., or 72.5% based on the Cl ketoxime used. To the Cl ketoxime-O ether formed, ether and a molal quantity of hydrochloric acid were added, the hydrochloride (Fp. 218° C.–219° C.) separating out to give a yield of 80%, based on the Cl ketoxime-O ether used.

EXAMPLE 3.—PREPARATION OF 10,11-DIHYDRO-5H-DIBENZO (a,d)-CYCLOHEPTADIENE (1,4)-5-HYDROXYIMINO - O - ETHYL ($\beta$ - DIMETHYLAMINO) ETHER A quantity of 62 g. (~0.3 mol) of 10,11-dihydro-5H-dibenzo (a,d)-cycloheptadiene (1,4)-5-on and 62 g. (~0.9 mol) of hydroxylamine hydrochloride in 0.93 litre of pyridine was boiled for 24 hours with reflux and then treated as in Example 2. This produced 60.2 g. of ketoxime (Fp. 171° C.–172° C.) equivalent to a yield of 90%, based on the ketone used.

For further conversion, 30.15 g. (0.135 mol) of ketoxime was dissolved in a solution of 7 g. (0.304 mol) of sodium in 400 ml. of ethanol and boiled with reflux, a solution of 24.35 g. (0.169 mol) of $\beta$-chlorethyl dimethylamine hydrochloride in 150 ml. of ethanol being dripped in within 1½ hours. After a further 4 hours' boiling, the common salt separating out from the resultant solution was filtered off and the solvent evaporated. The oily residue was distilled at 181° C.–185° C. in a high vacuum of 0.01 torr. The yield of ketoxime-O ether was 29.9 g., or 75% based on the ketoxime used.

To the ketoxime-O ether formed, ether with a molal quantity of hydrochloric acid was added, whereupon the hydrochloride separated out, to give a yield of 80% based on the ketoxime-O ether used.

What is claimed is:

1. As a composition of matter, 10,11-dihydro-5H-dibenzo (a,d)-cycloheptadiene (1,4) - 5 - hydroxyimino - O-ether-$\beta$-diethylamino ether.

2. As a composition of matter, 3-chlor-10,11-dihydro-5H-dibenzo (a,d)-cycloheptadiene (1,4)-5-hydroxyimino-O-ethyl-($\beta$-dimethylamino) ether.

3. As a composition of matter, 10,11-dihydro-5H-dibenzo (a,d)-cycloheptadiene (1,4) - 5 - hydroxyimino - O-ethyl ($\beta$-dimethylamino) ether.

References Cited by the Examiner

UNITED STATES PATENTS

| | | | |
|---|---|---|---|
| 1,733,462 | 10/1929 | Kropp | 260—566 |
| 2,832,804 | 4/1958 | Richter et al. | 260—566 |
| 3,012,074 | 12/1961 | Horrom | 260—566 |

CHARLES B. PARKER, *Primary Examiner.*

JOSEPH P. BRUST, *Examiner.*

ROBERT V. HINES, *Assistant Examiner.*

UNITED STATES PATENT OFFICE
CERTIFICATE OF CORRECTION

Patent No. 3,270,055                                                August 30, 1966

Hermann Engelhard et al.

It is certified that error appears in the above identified patent and that said Letters Patent are hereby corrected as shown below:

Column 3, EXAMPLE 1, line 3 thereof, "ETHER" should read --ETHYL --.
Column 4, line 55, "ether", first occurrence, should read -- ethyl --.

Signed and sealed this 17th day of March 1970.

(SEAL)
Attest:

Edward M. Fletcher, Jr.                          WILLIAM E. SCHUYLER, JR.
Attesting Officer                                        Commissioner of Patents